(12) United States Patent
Dai

(10) Patent No.: US 11,070,122 B2
(45) Date of Patent: Jul. 20, 2021

(54) MULTI-DEGREE-OF-FREEDOM ELECTROMAGNETIC MACHINE

(71) Applicant: HONEYWELL INTERNATIONAL INC., Morris Plains, NJ (US)

(72) Inventor: Zhijun Dai, Shanghai (CN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 232 days.

(21) Appl. No.: 16/283,149

(22) Filed: Feb. 22, 2019

(65) Prior Publication Data
US 2020/0274435 A1 Aug. 27, 2020

(51) Int. Cl.
| H02K 41/03 | (2006.01) |
| H01Q 1/12 | (2006.01) |
| H02K 7/09 | (2006.01) |

(52) U.S. Cl.
CPC .......... *H02K 41/031* (2013.01); *H01Q 1/125* (2013.01); *H02K 7/09* (2013.01); *H02K 2201/03* (2013.01); *H02K 2201/18* (2013.01)

(58) Field of Classification Search
CPC ............. H02K 41/031; H02K 2201/18; H02K 2201/03; H02K 7/09; H02K 1/2706; H02K 11/21; H01Q 1/125
USPC ......... 310/13, 98, 115, 116, 118, 177, 12.04, 310/12.17, 12.19
See application file for complete search history.

(56) References Cited

U.S. PATENT DOCUMENTS

| 3,105,657 | A | | 10/1963 | Mueller et al. |
| 3,178,600 | A | | 4/1965 | Bers |
| 3,295,379 | A | | 1/1967 | Jensen et al. |
| 4,611,863 | A | | 9/1986 | Isely |
| 4,661,737 | A | * | 4/1987 | Barri ............... H02K 17/16 244/166 |

(Continued)

FOREIGN PATENT DOCUMENTS

| CN | 102975868 | 3/2013 |
| GB | 802776 | 10/1958 |

(Continued)

OTHER PUBLICATIONS

Wu, Xingming, et al., "Dynamic Modelling and Parameter Identification of a Three-Degree-of-Freedom Spherical Actuator," Transactions of the Institute of Measurement and Control, vol. 36(1), downloaded from tim.sagepub.com on Jan. 25, 2016.

(Continued)

*Primary Examiner* — Ahmed Elnakib
(74) *Attorney, Agent, or Firm* — Lorenz & Kopf, LLP

(57) ABSTRACT

A multi-degree-of-freedom electromagnetic machine includes a spherical armature, a first coil, a second coil, a third coil, a structure, a stator, and a bracket. The spherical armature has a first axis of symmetry, a second axis of symmetry, a third axis of symmetry, and the first, second, and third axes of symmetry are disposed perpendicular to each other. The spherical armature and structure are rotatable together, relative to the bracket and the stator, about the first axis of symmetry; the spherical armature, structure, and bracket are rotatable together, relative to the stator, about the second axis of symmetry; and the spherical armature, structure, bracket, and stator are rotatable together about the third axis of symmetry.

20 Claims, 11 Drawing Sheets

(56) References Cited

U.S. PATENT DOCUMENTS

| | | | |
|---|---|---|---|
| 4,719,381 A * | 1/1988 | Miles | H02K 41/02 |
| | | | 310/166 |
| 4,855,838 A | 8/1989 | Jones et al. | |
| 4,908,558 A * | 3/1990 | Lordo | B64G 7/00 |
| | | | 244/1 R |
| 4,961,352 A | 10/1990 | Downer et al. | |
| 5,204,573 A | 4/1993 | Bederson et al. | |
| 5,413,010 A | 5/1995 | Nakanishi et al. | |
| 6,906,441 B2 | 6/2005 | Mendenhall | |
| 7,614,804 B2 | 11/2009 | Kim | |
| 7,630,620 B2 | 12/2009 | Benson et al. | |
| 7,675,208 B2 | 3/2010 | Bandera | |
| 7,812,507 B2 | 10/2010 | Takahashi et al. | |
| 7,960,896 B2 | 6/2011 | Takahashi et al. | |
| 7,969,375 B2 | 6/2011 | Blalock | |
| 8,459,383 B1 | 6/2013 | Burget | |
| 8,600,600 B2 | 12/2013 | Jung | |
| 9,893,574 B2 * | 2/2018 | Bandera | H02K 21/22 |
| 10,374,483 B1 * | 8/2019 | Dai | F16M 13/02 |
| 2004/0021785 A1 | 2/2004 | Pshtissky et al. | |
| 2008/0073989 A1 | 3/2008 | Bandera | |
| 2008/0240706 A1 * | 10/2008 | Akiba | H02K 7/09 |
| | | | 396/428 |
| 2011/0064403 A1 | 3/2011 | Nakano et al. | |
| 2012/0139744 A1 | 6/2012 | Ridgway | |
| 2014/0125153 A1 * | 5/2014 | Ho | H02K 21/26 |
| | | | 310/36 |
| 2014/0191626 A1 | 7/2014 | Hollis, Jr. et al. | |
| 2014/0209751 A1 | 7/2014 | Stagmer | |
| 2016/0357272 A1 | 12/2016 | Kumahara et al. | |
| 2017/0012482 A1 | 1/2017 | Bandera | |
| 2020/0274435 A1 * | 8/2020 | Dai | H01Q 1/125 |

FOREIGN PATENT DOCUMENTS

| | | |
|---|---|---|
| GB | 2330457 A | 4/1999 |
| JP | S60204252 A | 10/1985 |
| JP | 5164062 B2 | 3/2013 |
| WO | 9919971 A1 | 4/1999 |
| WO | 2004001941 A1 | 12/2003 |

OTHER PUBLICATIONS

Wang, J., et al. "Multi-Degree-of-Freedom Spherical Permanent Magnet Motors," Proceedings of the 2001 IEEE International Conference on Robotics & Automation, Seoul, Korea, May 21-26, 2001.

Bederson, B.B. et al.; Two Miniature Pan-Tilt Devices; Proceedings of the 1992 IEEE International Conference on Robotics and Automation; France, May 1992.

Bolognesi, P. et al.; Electromagnetic Actuators Featuring Multiple Degrees of Freedom: a Survey; Paper presented at ICEM 2004 Conference, Krakow (Poland) Sep. 5-8, 2004.

Bederson, B. B. et al.; A Miniature Pan-Tilt Actuator: The Spherical Pointing Motor; IEEE Transactions on Robotics and Automation, vol. 10, No. 3, Jun. 1994.

Miles, A.R.; They pop up here and there. Do they have a future? Spherical electric motors; Oct. 1990.

Choi, Y, et al.; Halbach Magnetic Circuit for Voice Coil Motor in Hard Disk Drives; Journal of Magnetics 15(3) 143-147, 2010.

Steele, A.B.; Design of a Lorentz, Slotless Self-Bearing Motor for Space Applications, Dec. 13, 2002.

* cited by examiner

MULTI-DEGREE-OF-FREEDOM ELECTROMAGNETIC MACHINE

TECHNICAL FIELD

The present invention generally relates to electromagnetic machines, and more particularly relates to a multi-degree-of-freedom electromagnetic machine.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

Various attempts have been made to develop electromagnetic machines (e.g., motors) that can rotate in multiple degrees-of-freedom. The electromagnetic machines heretofore developed suffer certain drawbacks. For example, the machines can be relatively large and relatively expensive to manufacture, can be relatively complex, and are many times limited in the number of degrees-of-freedom that it can be rotated.

Hence, there is a need for multi-degree-of-freedom electromagnetic machine that is relatively small and inexpensive, as compared to known designs, and that can independently or synchronously generate torque and/or rotate along three perpendicular axes. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree-of-freedom electromagnetic machine includes a spherical armature, a first coil, a second coil, a third coil, a structure, a stator, and a bracket. The spherical armature has a first axis of symmetry, a second axis of symmetry, a third axis of symmetry, and the first, second, and third axes of symmetry are disposed perpendicular to each other. The first coil is wound on the spherical armature about the first axis of symmetry, the second coil is wound on the spherical armature about the second axis of symmetry, and the third coil is wound on the spherical armature about the third axis of symmetry. The structure is coupled to the spherical armature and extends therefrom along the first axis of symmetry. The stator is spaced apart from, and surrounds at least a portion of, the spherical armature. The stator is mounted for rotation about the third axis of symmetry, and includes an outer surface, an inner surface, and a plurality of spaced-apart stator coils. Each stator coil is configured, upon being electrically energized, to generate a magnetic field. The bracket is rotationally coupled to the outer surface of the stator and is rotationally coupled to the structure. The spherical armature and structure are rotatable together, relative to the bracket and the stator, about the first axis of symmetry; the spherical armature, structure, and bracket are rotatable together, relative to the stator, about the second axis of symmetry; and the spherical armature, structure, bracket, and stator are rotatable together about the third axis of symmetry.

In another embodiment, a multi-degree-of-freedom electromagnetic machine includes a spherical armature, a first coil, a second coil, a third coil, a structure, a stator, a bracket, and a control. The spherical armature has an inner surface, an outer surface, and an opening that extends between the inner surface and the outer surface. The inner surface defines a cavity, and the spherical armature further has a first axis of symmetry, a second axis of symmetry, a third axis of symmetry, and the first, second, and third axes of symmetry are disposed perpendicular to each other. The first coil is wound on the spherical armature about the first axis of symmetry, the second coil is wound on the spherical armature about the second axis of symmetry, and the third coil is wound on the spherical armature about the third axis of symmetry. The structure is disposed at least partially within the cavity and extends through the opening along the first axis of symmetry. The stator is spaced apart from, and surrounds at least a portion of, the spherical armature. The stator is mounted for rotation about the third axis of symmetry, and includes an outer surface, an inner surface, and a plurality of spaced-apart stator coils. Each stator coil is configured, upon being electrically energized, to generate a magnetic field. The bracket is rotationally coupled to the outer surface of the stator and is rotationally coupled to the structure. The control is coupled to, and is configured to selectively control current magnitudes and directions to the plurality of stator windings, the first coil, the second, and the third coil, to thereby generate a Lorentz force that causes rotation of one or more of the spherical armature, the structure, the bracket, and the stator. The spherical armature and structure are rotatable together, relative to the bracket and the stator, about the first axis of symmetry; the spherical armature, structure, and bracket are rotatable together, relative to the stator, about the second axis of symmetry; and the spherical armature, structure, bracket, and stator are rotatable together about the third axis of symmetry.

In yet another embodiment, a multi-degree-of-freedom electromagnetic machine includes a spherical armature, a first coil, a second coil, a third coil, a structure, a stator, and a bracket. The spherical armature has an inner surface, an outer surface, and an opening that extends between the inner surface and the outer surface. The inner surface defines a cavity, and the spherical armature further has a first axis of symmetry, a second axis of symmetry, a third axis of symmetry, and the first, second, and third axes of symmetry are disposed perpendicular to each other. The first coil is wound on the spherical armature about the first axis of symmetry, the second coil is wound on the spherical armature about the second axis of symmetry, and the third coil is wound on the spherical armature about the third axis of symmetry. The structure is disposed at least partially within the cavity and extends through the opening along the first axis of symmetry. The stator is spaced apart from, and surrounds at least a portion of, the spherical armature. The stator is mounted for rotation about the third axis of symmetry, and includes an outer surface, an inner surface, a plurality of stator poles extending radially inwardly from the inner surface, and a plurality of spaced-apart stator coils wound around the stator poles. Each stator coil is configured, upon being electrically energized, to generate a magnetic field. The bracket is rotationally coupled to the outer surface of the stator and is rotationally coupled to the structure. The bracket includes a main body section, a first arm, and a second arm. The main body section is disposed intermediate the first arm and the second arm and has an opening formed therein. The first and second arms extend perpendicularly from the main body section, and the opening is disposed midway between the first arm and the second arm through which the structure extends. The spherical armature and structure are rotatable together, relative to the bracket and the stator, about the first axis of symmetry; the spherical armature, structure, and bracket are rotatable together, relative to the stator, about the second axis of symmetry; and the spherical armature, structure, bracket, and stator are rotatable together about the third axis of symmetry.

Furthermore, other desirable features and characteristics of the multi-degree-of-freedom electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
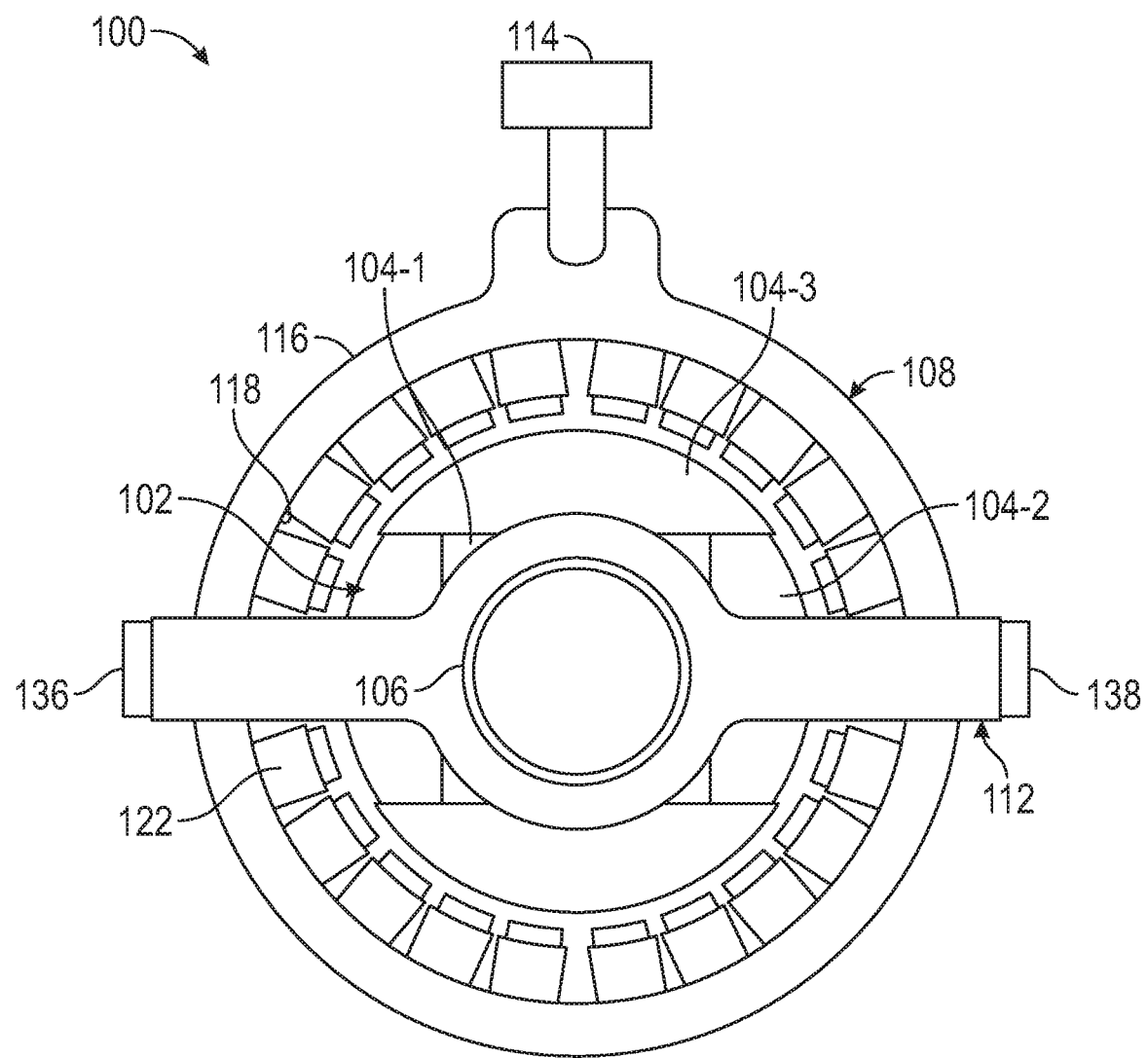
FIGS. 1-4 depict side, front, top, and exploded views, respectively, of one embodiment of a multi-degree-of-freedom electromagnetic machine.
Figure 2:
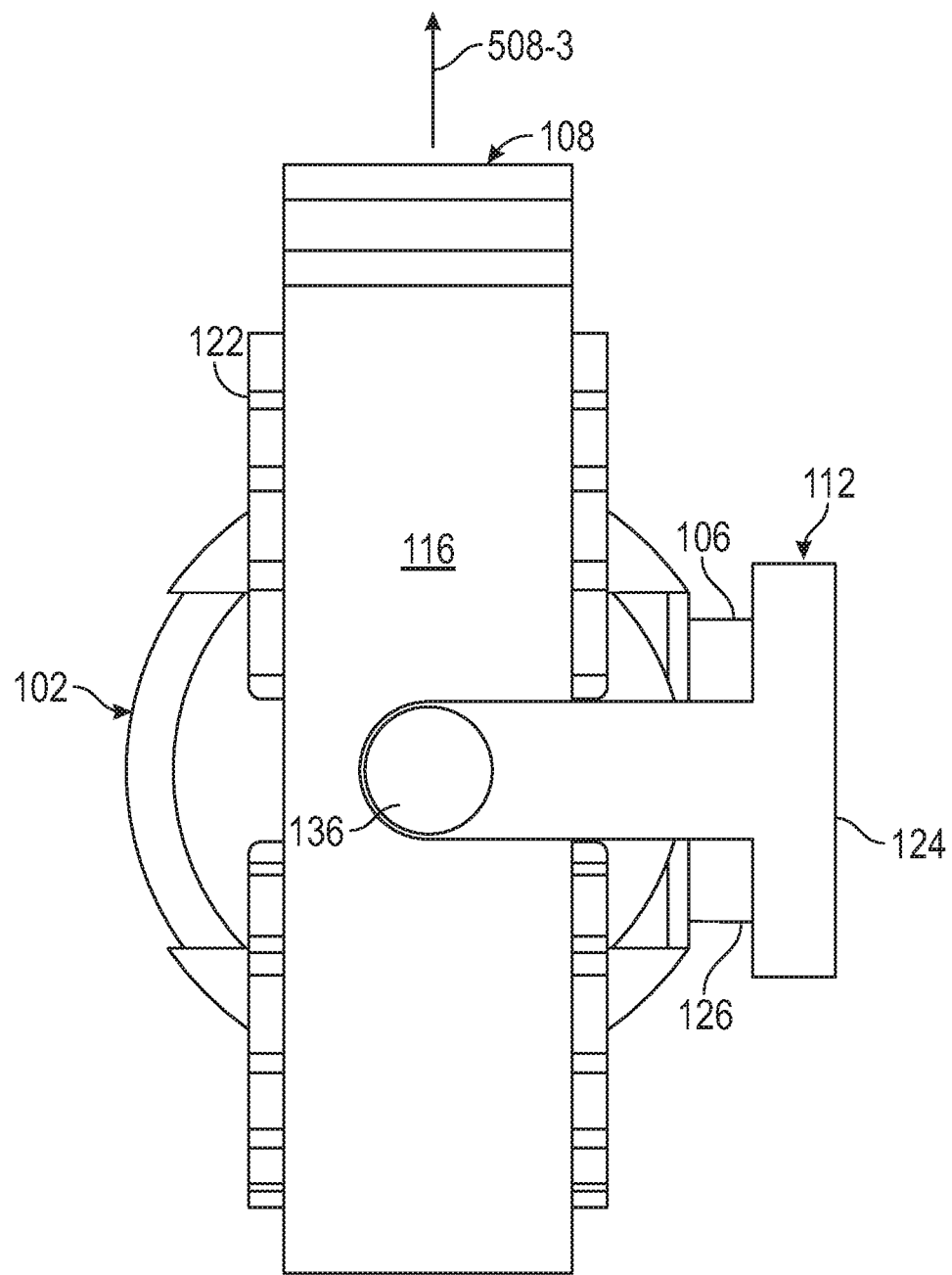
Figure 3:
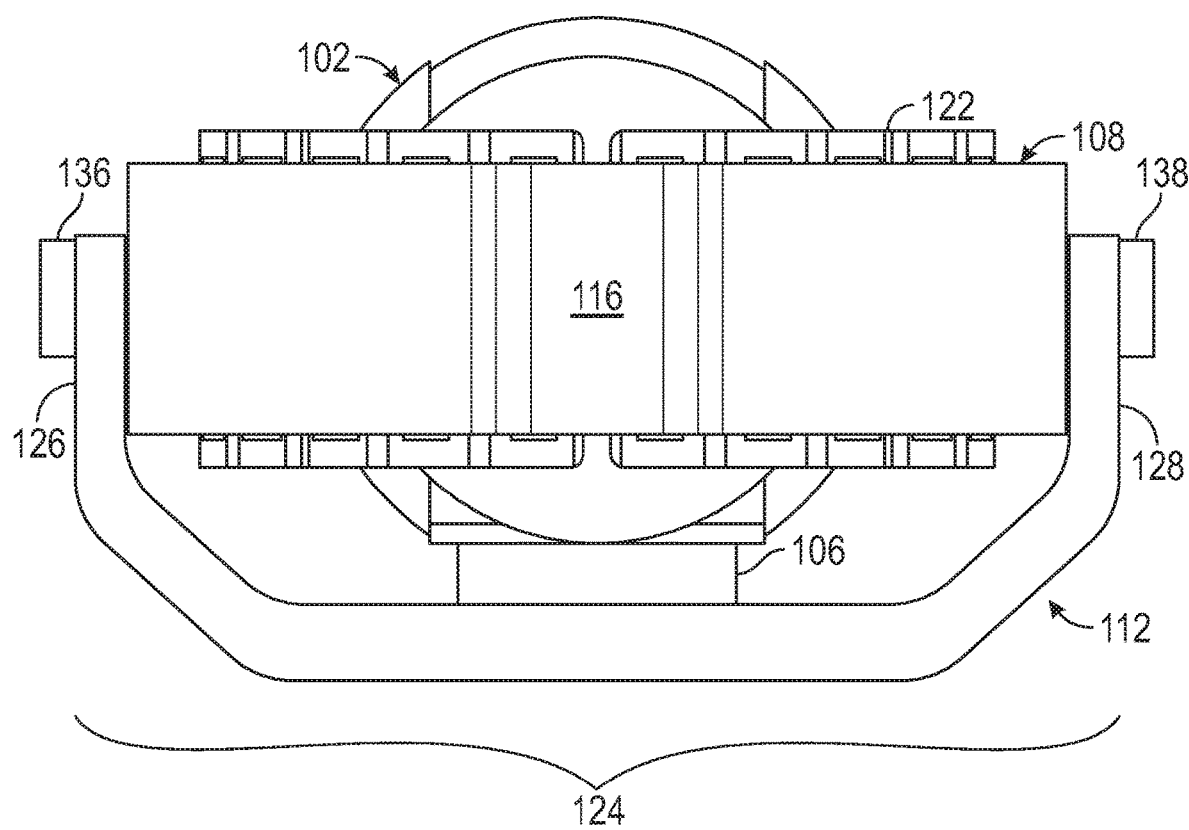
Figure 4:
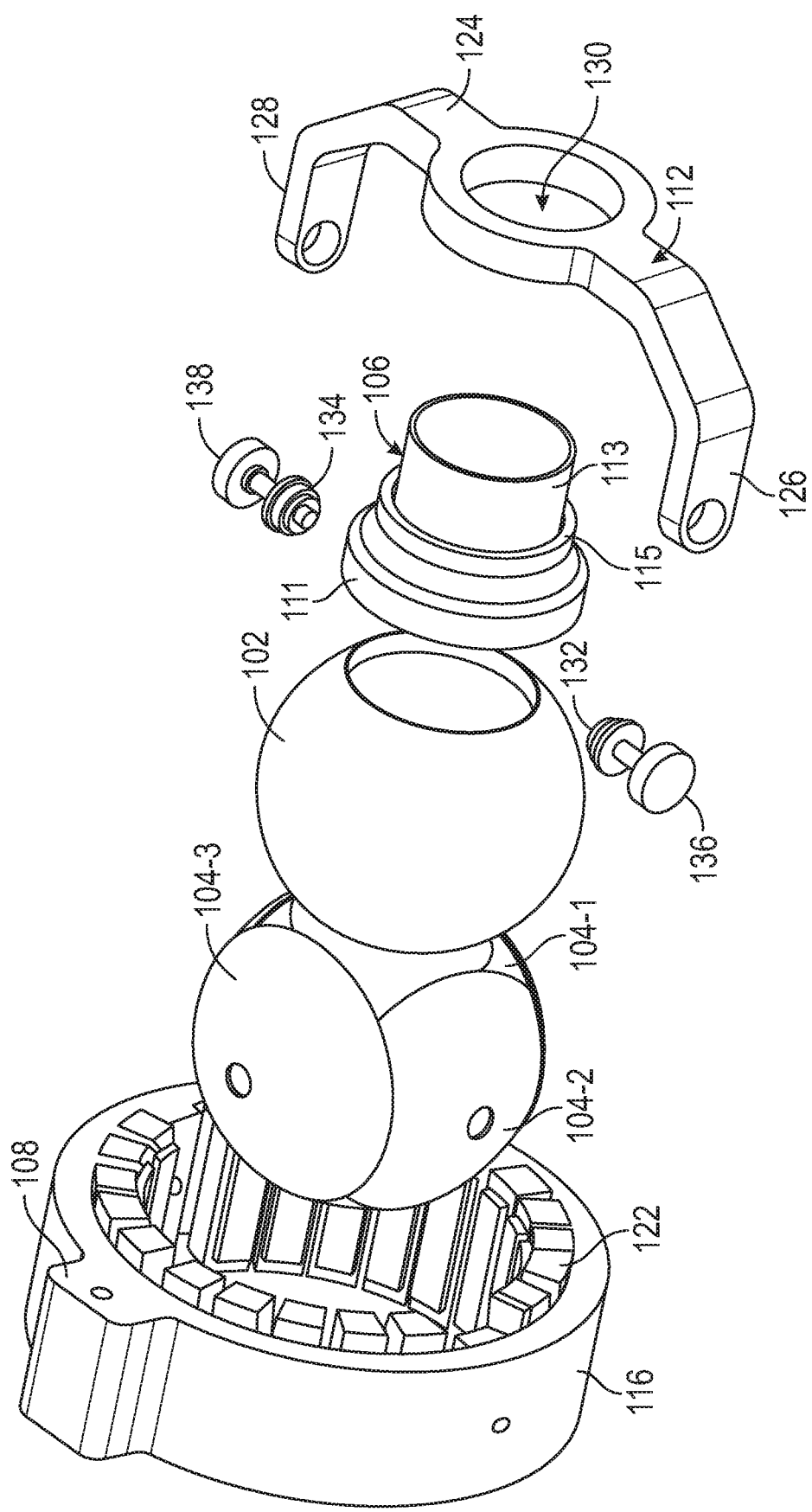

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring first to FIGS. 1-4, side, front, top, and exploded views, respectively, of one embodiment of a multi-degree-of-freedom electromagnetic machine 100 are depicted. The electromagnetic machine 100 includes at least a spherical armature 102, a plurality of coils 104, a structure 106, a stator 108, and a bracket 112. As FIG. 1 further depicts, the electromagnetic machine 100 may also include a stator mounting bracket 114. As will be described further below the electromagnetic machine 100 may also be coupled to, and controlled, by a suitably configured control.

Figure 5:
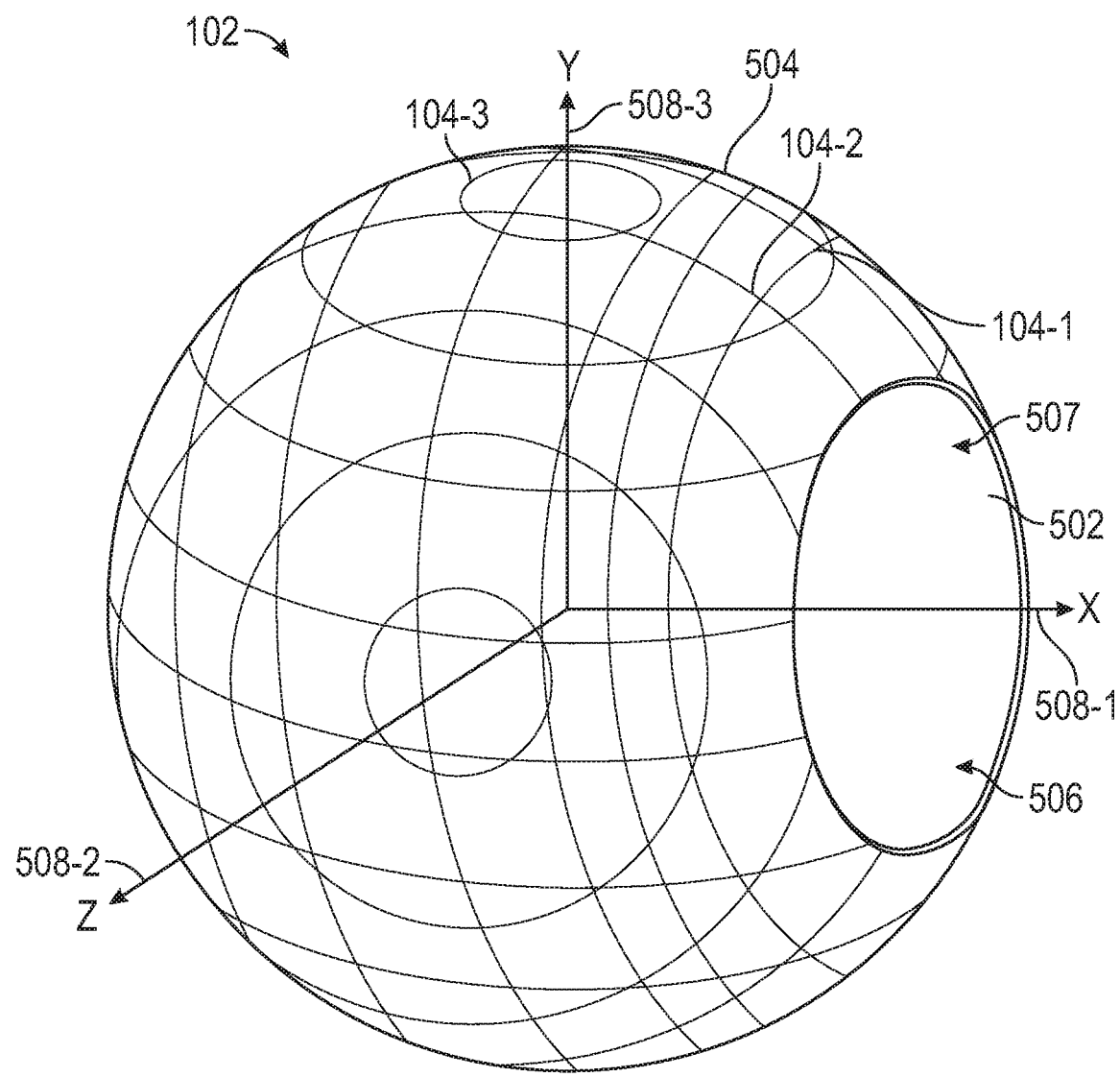
FIG. 5 depicts a perspective view of one embodiment of a spherical armature with orthogonally arranged windings disposed thereon.

With reference now to FIG. 5, it is seen that the spherical armature 102 includes an inner surface 502 and an outer surface 504, where the inner surface 502 defines a cavity 506. As FIG. 5 further depicts, the spherical armature 102 may additionally include an opening 507. The purpose of the opening 507 is discussed further below. By virtue of its shape, the spherical armature 102 has three perpendicularly disposed axes of symmetry 508—a first axis of symmetry 508-1, a second axis of symmetry 508-2, and a third axis of symmetry 508-3. It should be noted that a sphere has an infinite number of axes of symmetry. Thus, the first, second, and third axes of symmetry 508-1, 508-2, 508-3, could be any one of these axes of symmetry, so long as all three axes of symmetry are perpendicular to each other. The spherical armature 102 may be formed of any one of numerous magnetic or non-magnetic materials, such as, for example, iron, magnetic steel, or plastic.

With continued reference to FIG. 5, the plurality of coils 104 comprise three coils—a first coil 104-1, a second coil 104-2, and a third coil 104-3. The first coil 104-1 is wound on the spherical armature 102 about the first axis of symmetry 508-1, the second coil 104-2 is wound on the spherical armature 102 about the second axis of symmetry 508-2, and the third coil 104-3 is wound on the spherical armature 102 about the third axis of symmetry 508-3. It will be appreciated that the coils 104 are each formed of any one of numerous types and shapes of electrically conductive materials, and may be implemented using one or a plurality of these conductive materials. It will additionally be appreciated that the coils 104 may each be implemented using single, discrete contiguous conductors, or using a plurality of conductors, and may be formed, for example, using additive (e.g., printed conductors) or subtractive (e.g., PWB etching) techniques, and may be conductive wires, ribbons, or sheets, just to name a few non-limiting examples.

Returning now to FIGS. 1-4, the structure 106 is coupled to the spherical armature 102 and extends therefrom along the first axis of symmetry 508-1. The structure 106 may be variously configured, but in the depicted embodiment it includes a flange portion 111 and a sleeve portion 113. The flange portion 111 is disposed within the cavity 506, and the sleeve portion 113 extends from the opening 507 in the spherical armature 102 and is disposed within an opening 130 formed in the bracket 112. A bearing 115 surrounds the sleeve portion 113 and is disposed within the opening 130. The bearing 115 engages the structure 106 and the bracket 112, thus allowing the spherical armature 102 and structure 106 to rotate together, relative to the bracket 112 and the stator 108, about the first axis of symmetry 508-1.

Figure 6:
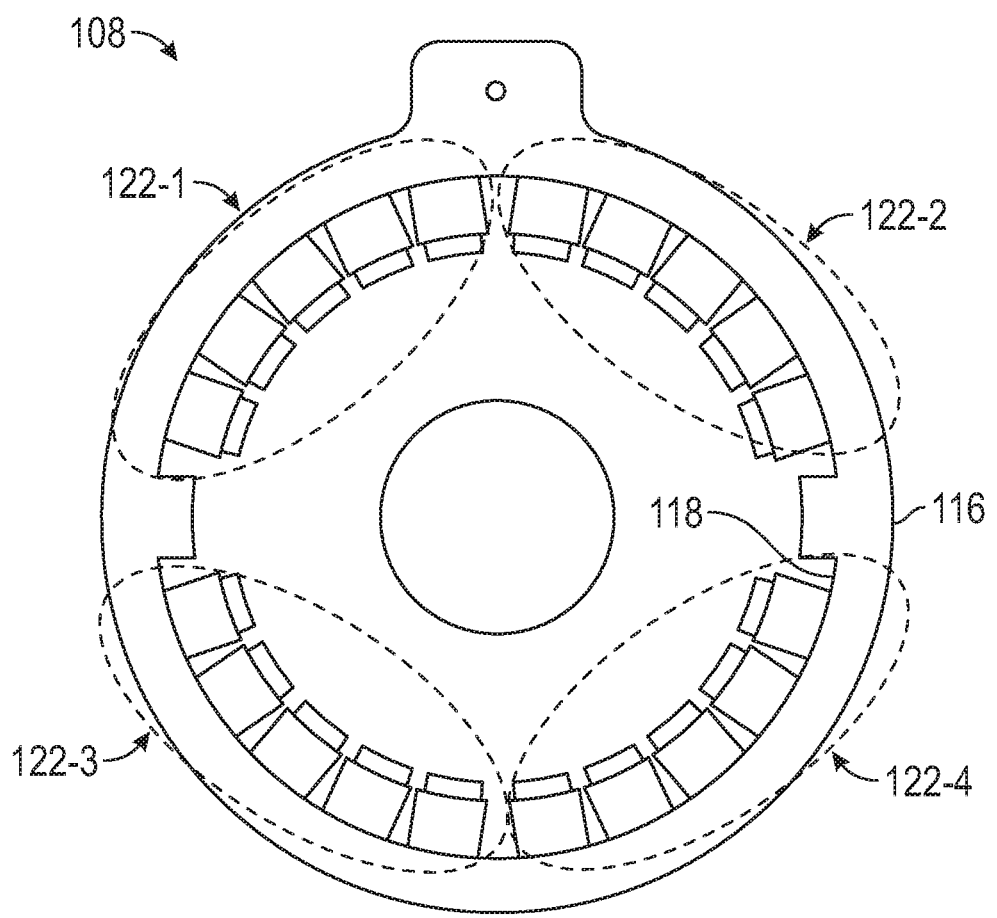
FIG. 6 depicts a front view of one embodiment of a stator that may be used to implement the multi-degree-of-freedom electromagnetic machine of FIG. 1.

The stator 108, which preferably comprises a magnetically permeable material such as, for example, iron or an iron alloy, is spaced apart from, and surrounds at least a portion of, the spherical armature 102. The stator 108 is coupled to the stator mounting bracket 114, and includes an outer surface 116, an inner surface 118, and a plurality of spaced-apart stator coils 122. The stator mounting bracket 114 is configured to allow rotation of the stator 108 about the third axis of symmetry 508-3. As a result, the spherical armature 102, structure 106, bracket 112, and stator 108 are rotatable together about the third axis of symmetry 508-3. Although the stator 108 may be variously configured, in the depicted embodiment, and as FIG. 6 most clearly depicts, it is configured to include a plurality of stator poles 602 that extend radially inwardly from the inner surface 118. The plurality of stator coils 122 are wound around the plurality of stator poles. Although the number of stator coils 122 may vary, in the embodiment depicted in FIG. 6, the stator 108 has four stator coils 122 (e.g., 122-1, 122-2, 122-3, 122-4) wound thereon.

Regardless of the number of stator coils 122, each stator coil 122, as is generally known, will generate a magnetic field upon being electrically energized. As is also generally known, the relative magnetic field strength and the direction of the magnetic poles, is controllable by adjusting the electrical current magnitude and direction in each of the stator coils. For example, the stator coils 122 can be energized such that each generates a magnetic field in which either the north pole (N) or the south pole (P) is closer to the spherical armature 102.

Returning once again to FIGS. 1-4, the bracket 112 is rotationally coupled to the outer surface of the stator 108 and is rotationally coupled to the structure 106. Although the bracket may be variously configured, in the depicted embodiment, it includes a main body section 124, a first arm 126, and a second end arm 128. The main body section 124 is disposed intermediate the first arm 126 and the second arm 128 and includes the opening 130, which is disposed midway between the first and second arms 126, 128. The first arm 126 and second arm 128 each extends perpendicularly from the main body section 124.

The bracket 112, the spherical armature 102, and the structure 106 are rotatable together, relative to the stator 108, about the second axis of symmetry 508-2. To facilitate this, a first bearing assembly 132 is disposed between the first arm 126 and the stator 108, and a second bearing assembly 134 is disposed between the second arm 128 and the stator 108. Although the first and second bearing assemblies 132, 134 may be secured in place using any one of numerous types of securing hardware, in the depicted embodiment first and second bolts 136, 138 are used.

As noted above, the stator coils 122 are configured, upon being electrically energized, to generate a magnetic field. The magnetic flux from the generated magnetic fields travels into the spherical armature 102 on one side and back out on the other side, and travels through the first, second, and third coils 104-1, 104-2, 104-2. As may be appreciated, when direct current (DC) is supplied to one or more of the first, second, and third coils 104-1, 104-2, 104-2, a Lorentz force is generated, which in turn generates a torque about one or more of the first, second, and third axes symmetry of 508-1, 508-2, 508-3. The direction of the generated torque, as may also by appreciated, is based on the direction of the current flow in the stator coils 122, and in the first, second, and third coils 104-1, 104-2, 104-2.

Figure 7:
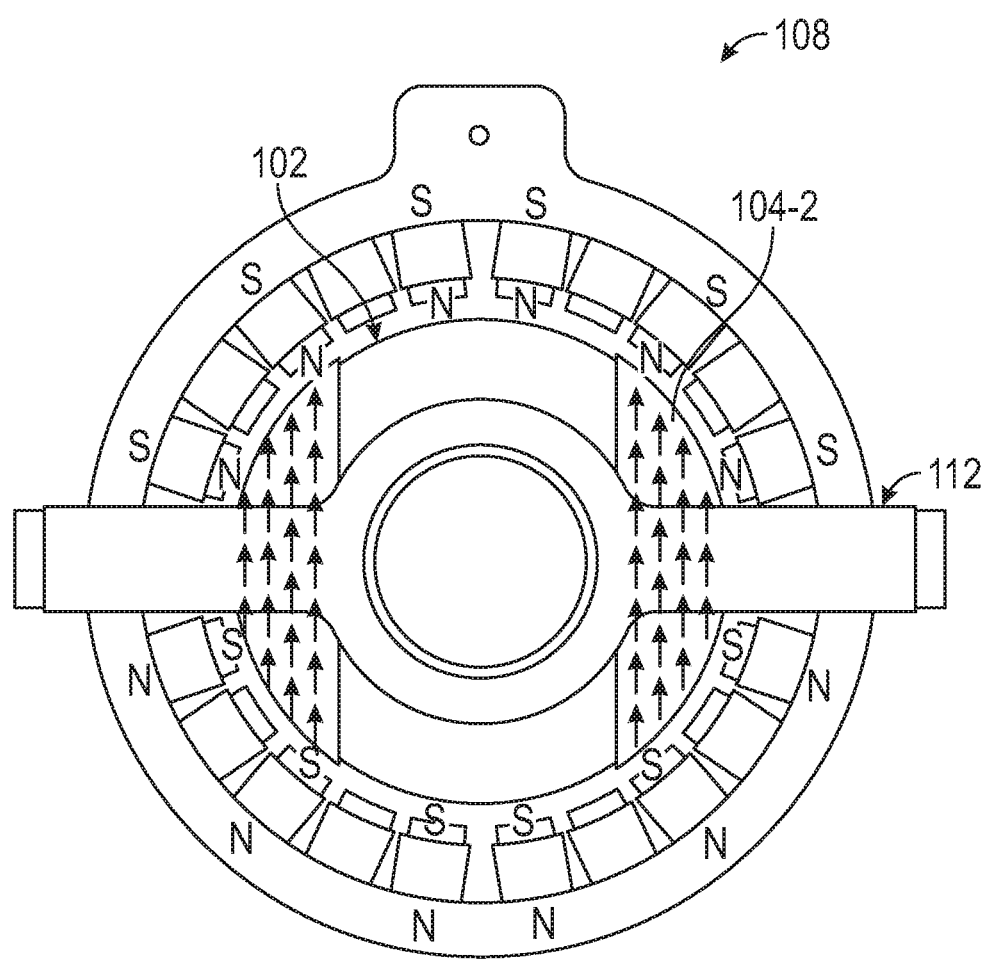
FIGS. 7 and 8 illustrate how current to the multi-degree-of-freedom electromagnetic machine is controlled to cause rotation thereof about a first axis of symmetry.
Figure 8:
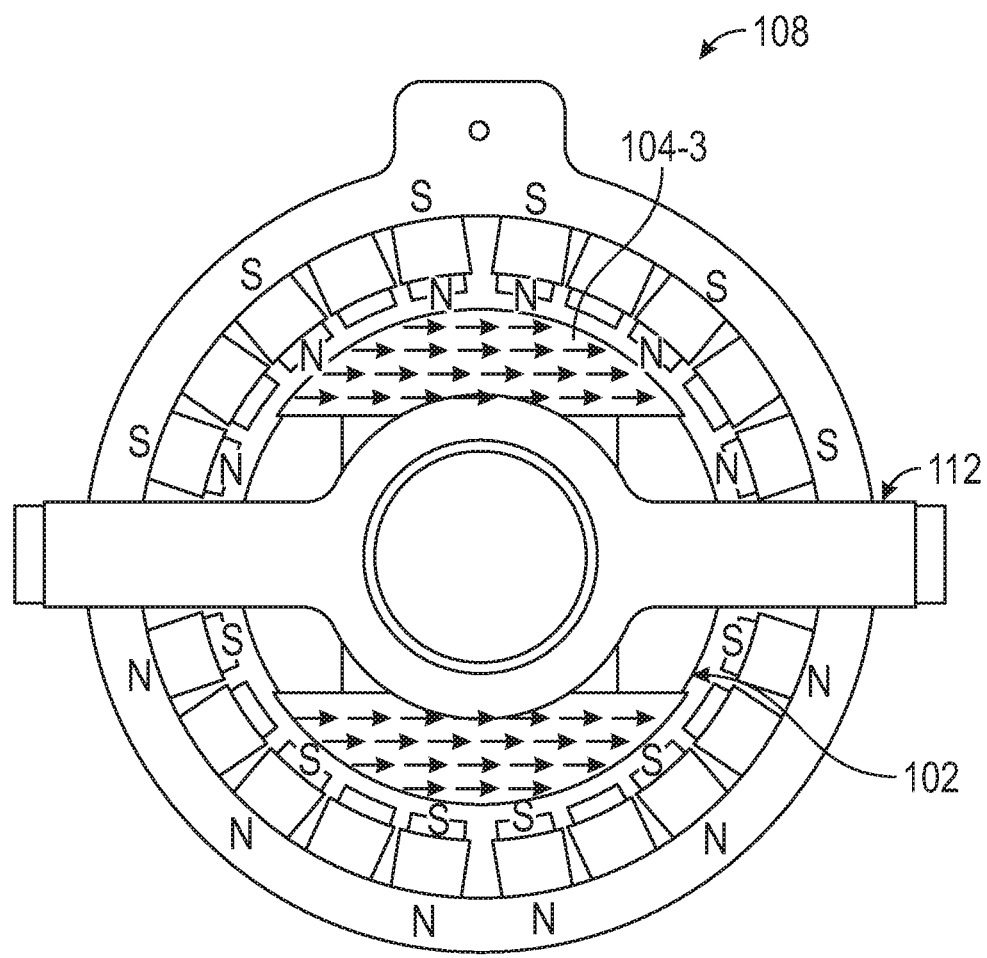

For example, to cause the spherical armature 102 to rotate about the first axis of symmetry 508-1, the stator coils 122 are energized such that the generated magnetic fields above the bracket 112 (as viewed from the perspective of FIGS. 7 and 8) have north poles (N) facing the spherical armature 102 and the magnetic fields below the bracket 112 have south poles (S) facing the spherical armature 102. Moreover, current is supplied to the second and third coils 104-2, 104-3 in the directions indicated with the arrows in FIGS. 7 and 8, respectively. As a result, a Lorentz force is generated causing the spherical armature 102, and thus also the structure 106, to rotate together, relative to the bracket 112 and the stator 108, about the first axis of symmetry 508-1. As may be appreciated, the magnitude and direction of the Lorentz force can be varied by adjusting the amplitude and direction of the current in the second and third coils 104-2, 104-3, or changing the pole directions of the generated magnetic fields.

Figure 9:
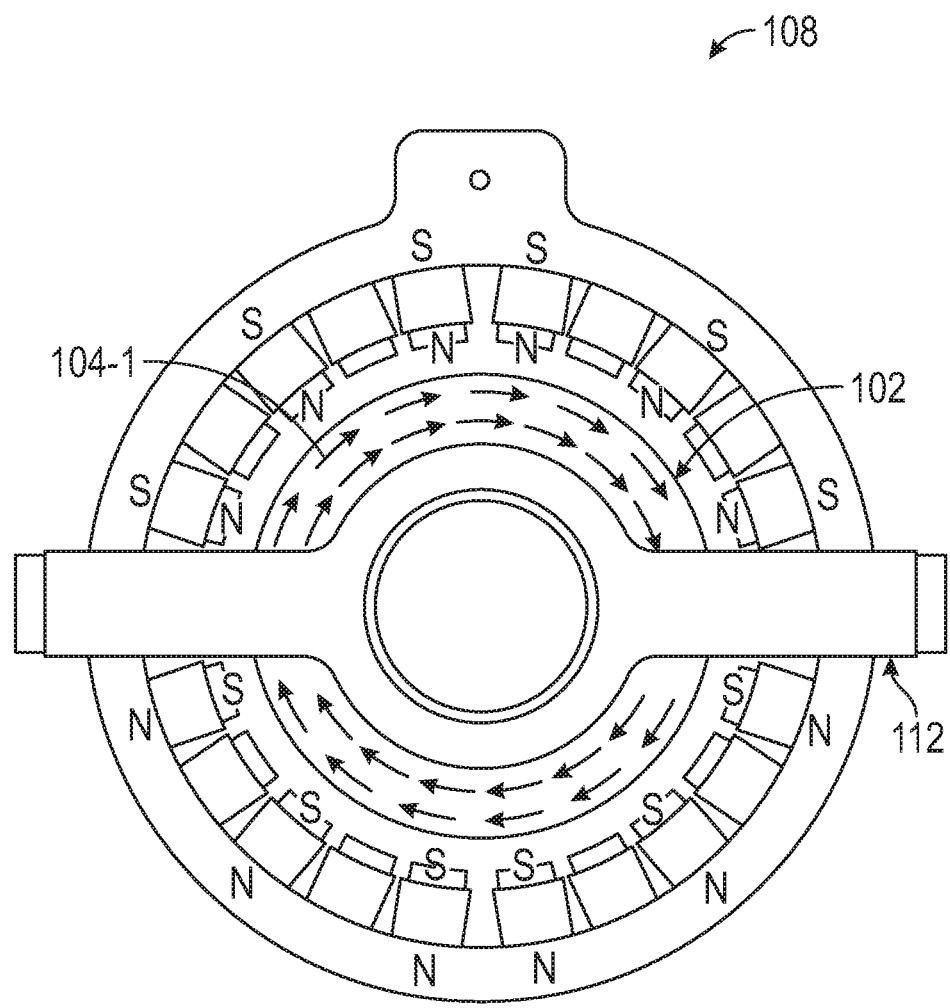
FIGS. 9 and 10 illustrate how current to the multi-degree-of-freedom electromagnetic machine is controlled to cause rotation thereof about a second axis of symmetry.
Figure 10:
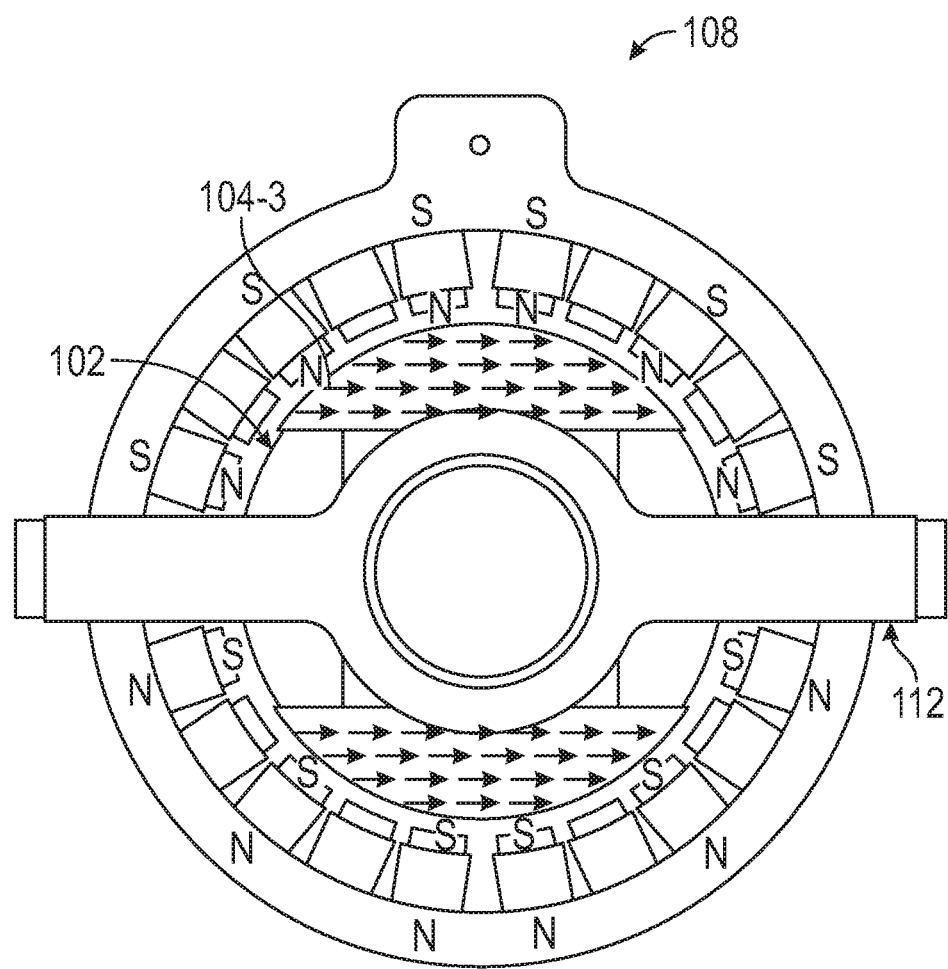

To cause the spherical armature 102 to rotate about the second axis of symmetry 508-2, the stator coils 122 are also energized such that the generated magnetic fields above the bracket 112 (as viewed from the perspective of FIGS. 9 and 10) have north poles (N) facing the spherical armature 102 and the magnetic fields below the bracket 112 have south poles (S) facing the spherical armature 102. Moreover, current is supplied to the first and third coils 104-1, 104-3 in the directions indicated with the arrows in FIGS. 9 and 10, respectively. As a result, a Lorentz force is generated causing the spherical armature 102, and thus also the structure 106 and the bracket 112, to rotate together, relative to the stator 108, about the second axis of symmetry 508-2. Here too, the magnitude and direction of the Lorentz force can be varied by adjusting the amplitude and direction of the current in the first and third coils 104-1, 104-3, or changing the pole directions of the generated magnetic fields.

Figure 11:
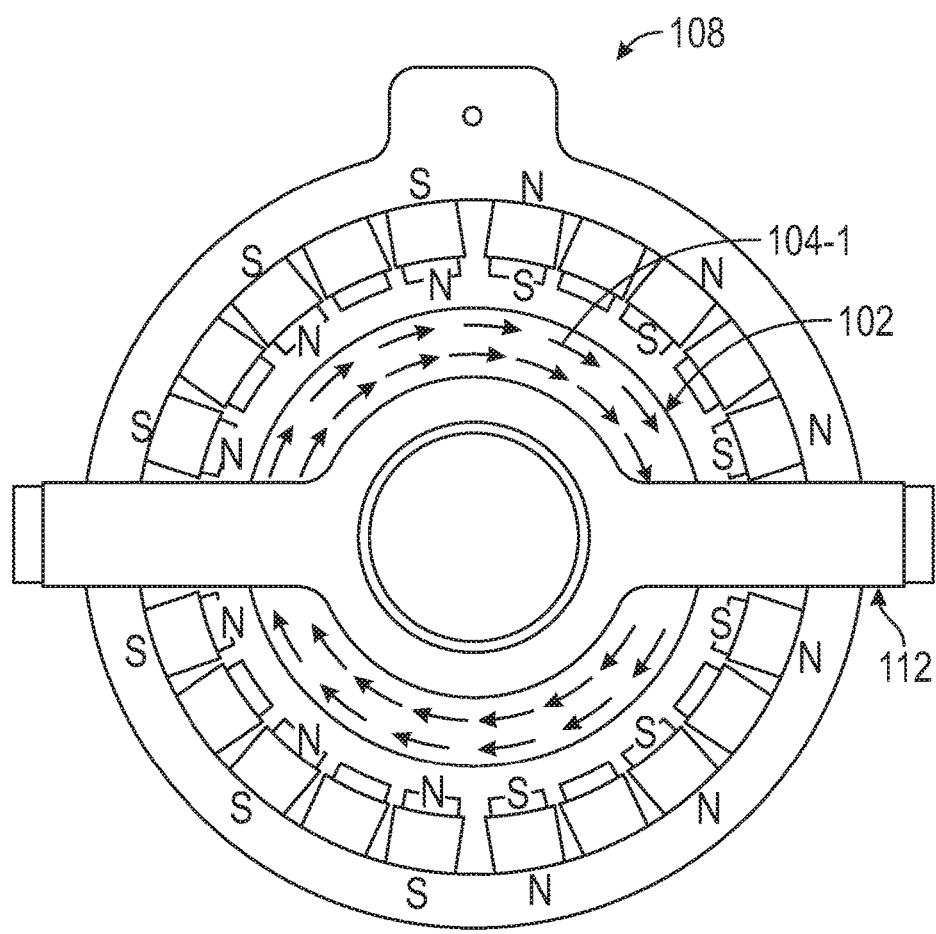
FIG. 11 illustrates how current to the multi-degree-of-freedom electromagnetic machine is controlled to cause rotation thereof about a third axis of symmetry.

To cause the spherical armature 102 to rotate about the third axis of symmetry 508-3, the stator coils 122 are also energized such that the generated magnetic fields one the left side of the stator 108 (as viewed from the perspective of FIG. 11) have north poles (N) facing the spherical armature 102 and the magnetic fields on the right side of the stator 108 have south poles (S) facing the spherical armature 102. Moreover, current is supplied to the first coil 104-1 in the direction indicated with the arrows in FIG. 11. As a result, a Lorentz force is generated causing the spherical armature 102, and thus also the structure 106, the bracket 112, and stator 108, to rotate together about the third axis of symmetry 508-3. As before, the magnitude and direction of the Lorentz force can be varied by adjusting the amplitude and direction of the current in the first coil 104-1, or changing the pole directions of the generated magnetic fields.

Figure 12:
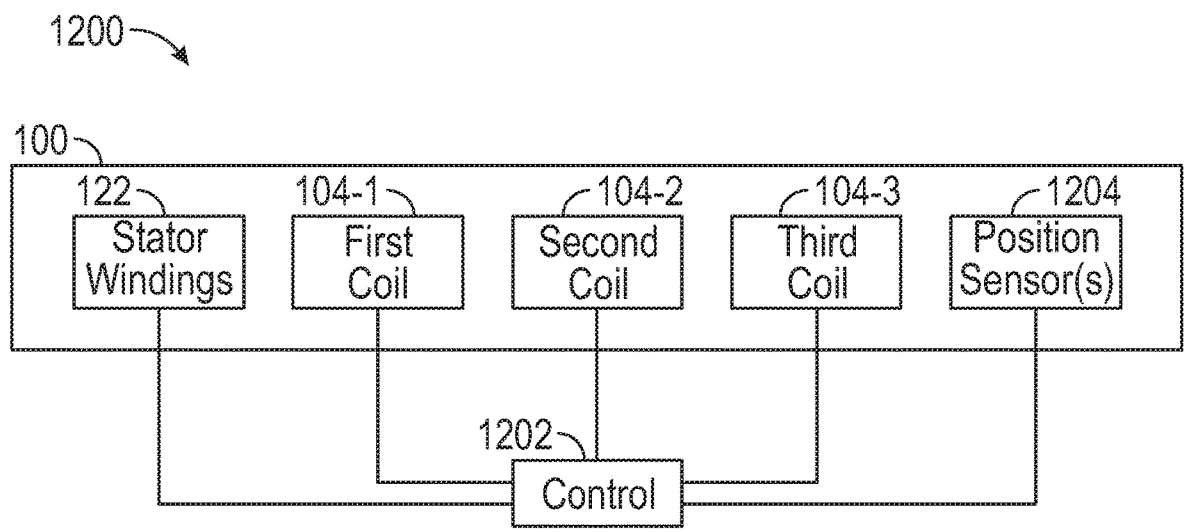
FIG. 12 depicts a functional block diagram of a multi-degree of freedom control system.

Referring now to FIG. 12, a functional block diagram of a multi-degree of freedom control system 1200 that includes the multi-degree of freedom electromagnetic machine 100 of FIGS. 1-11 is depicted. As FIG. 12 depicts, the system 1200 includes a control 1202 that is coupled to each of the stator coils 122, and to each of the first, second, and third coils 104. The control 1202 is configured to selectively energize the plurality of stator windings 108, the first coil 104-1, the second coil 104-2, and the third coil 104-3, to thereby generate the above-described Lorentz forces that cause rotation of the spherical armature 102, together with one or more of the structure 106, the bracket 112, and the stator 108. In particular, as was described above, the control 1202 is configured to control the current magnitudes and directions to the plurality of stator windings 122, the first coil 104-1, the second coil 104-2, and the third coil 104-3.

The control 1202 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 1202. Some non-limiting examples of suitable control techniques include PWM control and back EMF control.

If the control 1202 implements closed-loop control, then the control system 1200 may additionally include one or more position sensors 1204. The number and type of position sensors 1204 may vary. For example, the system 1200 may include one or more sensors 1204 to independently sense armature position along each axis of symmetry. Such sensors may be implemented using optical sensors, track balls, rotary sensors, or the like.

It will be appreciated that data and power may be transmitted to and from the coils 104, stator windings 122, and position sensor(s) 1204 (if included), using any one of numerous techniques. For example, data may be transmitted wirelessly, via flexible conductors, or via miniature slip rings, and power may be transmitted via flexible conductors, via miniature slip rings, or provided via a battery.

The multi-degree-of-freedom electromagnetic machine 100 described herein is relatively small and inexpensive, as compared to known designs, and can independently or synchronously generate torque and/or rotate along three perpendicular axes.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree-of-freedom electromagnetic machine, comprising:
    a spherical armature having a first axis of symmetry, a second axis of symmetry, a third axis of symmetry, the first, second, and third axes of symmetry disposed perpendicular to each other;
    a first coil wound on the spherical armature about the first axis of symmetry;
    a second coil wound on the spherical armature about the second axis of symmetry;
    a third coil wound on the spherical armature about the third axis of symmetry;
    a structure coupled to the spherical armature and extending therefrom along the first axis of symmetry;
    a stator spaced apart from, and surrounding at least a portion of, the spherical armature, the stator mounted for rotation about the third axis of symmetry, and including an outer surface, an inner surface, and a plurality of spaced-apart stator coils, each stator coil configured, upon being electrically energized, to generate a magnetic field; and
    a bracket rotationally coupled to the outer surface of the stator and rotationally coupled to the structure,
    wherein:
        the spherical armature and the structure are rotatable together, relative to the bracket and the stator, about the first axis of symmetry,
        the spherical armature, the structure, and the bracket are rotatable together, relative to the stator, about the second axis of symmetry, and
        the spherical armature, the structure, the bracket, and the stator are rotatable together about the third axis of symmetry.

2. The machine of claim 1, wherein:
    the spherical armature has an inner surface and an outer surface, the inner surface defining a cavity;
    the spherical armature has an opening that extends between the inner surface and the outer surface; and
    the structure is at least partially disposed within the cavity and extends through the opening.

3. The machine of claim 1, wherein:
    the bracket includes a main body section, a first arm, and a second arm;
    the main body section is disposed intermediate the first arm and the second arm and has an opening formed therein;
    the first arm and the second arm extend perpendicularly from the main body section;
    the opening is disposed midway between the first arm and the second arm; and
    the structure extends through the opening.

4. The machine of claim 3, further comprising:
    a first bearing assembly disposed between the first arm and the stator; and
    a second bearing assembly disposed between the second arm and the stator.

5. The machine of claim 3, further comprising:
    a bearing surrounding at least a portion of the structure and disposed within the opening, the bearing engaging the structure and the bracket.

6. The machine of claim 1, wherein the plurality of spaced-apart stator coils comprise a first stator coil, a second stator coil, a third stator coil, and a fourth stator coil.

7. The machine of claim 1, wherein:
    the stator comprises a plurality of stator poles extending radially inwardly from the inner surface; and
    the plurality of stator coils are wound around the plurality of stator poles.

8. The machine of claim 1, further comprising:
    a mounting bracket coupled to the spherical armature that allows the spherical armature, the structure, the bracket, and the armature to be rotatable together about the third axis of symmetry.

9. The machine of claim 1, further comprising:
    a control coupled to, and configured to selectively energize, the plurality of stator windings, the first coil, the second coil, and the third coil, to thereby generate a Lorentz force that causes rotation of one or more of the spherical armature, the structure, the bracket, and the stator.

10. The machine of claim 9, wherein the control is further configured to control current magnitudes and directions to the plurality of stator windings, the first coil, the second, and the third coil.

11. A multi-degree-of-freedom electromagnetic machine, comprising:
a spherical armature having an inner surface, an outer surface, and an opening that extends between the inner surface and the outer surface, the inner surface defining a cavity, the spherical armature further having a first axis of symmetry, a second axis of symmetry, a third axis of symmetry, the first, second, and third axes of symmetry disposed perpendicular to each other;
a first coil wound on the spherical armature about the first axis of symmetry;
a second coil wound on the spherical armature about the second axis of symmetry;
a third coil wound on the spherical armature about the third axis of symmetry;
a structure disposed at least partially within the cavity and extending through the opening along the first axis of symmetry;
a stator spaced apart from, and surrounding at least a portion of, the spherical armature, the stator mounted for rotation about the third axis of symmetry, and including an outer surface, an inner surface, and a plurality of spaced-apart stator coils, each stator coil configured, upon being electrically energized, to generate a magnetic field;
a bracket rotationally coupled to the outer surface of the stator and rotationally coupled to the structure; and
a control coupled to, and configured to selectively control current magnitudes and directions to the plurality of stator windings, the first coil, the second, and the third coil, to thereby generate a Lorentz force that causes rotation of one or more of the spherical armature, the structure, the bracket, and the stator,
wherein:
the spherical armature and the structure are rotatable together, relative to the bracket and the stator, about the first axis of symmetry,
the spherical armature, the structure, and the bracket are rotatable together, relative to the stator, about the second axis of symmetry, and
the spherical armature, the structure, the bracket, and the stator are rotatable together about the third axis of symmetry.

12. The machine of claim 11, wherein:
the bracket includes a main body section, a first arm, and a second arm;
the main body section is disposed intermediate the first arm and the second arm and has an opening formed therein;
the first arm and the second arm extend perpendicularly from the main body section;
the opening is disposed midway between the first arm and the second arm; and
the structure extends through the opening.

13. The machine of claim 12, further comprising:
a first bearing assembly disposed between the first arm and the stator; and
a second bearing assembly disposed between the second arm and the stator.

14. The machine of claim 12, further comprising:
a bearing surrounding at least a portion of the structure and disposed within the opening, the bearing engaging the structure and the bracket.

15. The machine of claim 11, wherein the plurality of spaced-apart stator coils comprise a first stator coil, a second stator coil, a third stator coil, and a fourth stator coil.

16. The machine of claim 11, wherein:
the stator comprises a plurality of stator poles extending radially inwardly from the inner surface; and
the plurality of stator coils are wound around the plurality of stator poles.

17. The machine of claim 11, further comprising:
a mounting bracket coupled to the armature that allows the spherical armature, the structure, the bracket, and the spherical armature to be rotatable together about the third axis of symmetry.

18. A multi-degree-of-freedom electromagnetic machine, comprising:
a spherical armature having an inner surface, an outer surface, and an opening that extends between the inner surface and the outer surface, the inner surface defining a cavity, the spherical armature further having a first axis of symmetry, a second axis of symmetry, a third axis of symmetry, the first, second, and third axes of symmetry disposed perpendicular to each other;
a first coil wound on the spherical armature about the first axis of symmetry;
a second coil wound on the spherical armature about the second axis of symmetry;
a third coil wound on the spherical armature about the third axis of symmetry;
a structure disposed at least partially within the cavity and extending through the opening along the first axis of symmetry;
a stator spaced apart from, and surrounding at least a portion of, the spherical armature, the stator mounted for rotation about the third axis of symmetry, and including an outer surface, an inner surface, a plurality of stator poles extending radially inwardly from the inner surface, and a plurality of spaced-apart stator coils wound around the stator poles, each stator coil configured, upon being electrically energized, to generate a magnetic field; and
a bracket rotationally coupled to the outer surface of the stator and rotationally coupled to the structure, the bracket including a main body section, a first arm, and a second arm, the main body section disposed intermediate the first arm and the second arm and having an opening formed therein, the first arm and second arms extending perpendicularly from the main body section, the opening disposed midway between the first arm and the second arm through which the structure extends,
wherein:
the spherical armature and structure are rotatable together, relative to the bracket and the stator, about the first axis of symmetry,
the spherical armature, the structure, and the bracket are rotatable together, relative to the stator, about the second axis of symmetry, and
the spherical armature, the structure, the bracket, and the stator are rotatable together about the third axis of symmetry.

19. The machine of claim 18, further comprising:
a first bearing assembly disposed between the first arm and the stator;
a second bearing assembly disposed between the second arm and the stator; and
a bearing surrounding at least a portion of the structure and disposed within the opening, the bearing engaging the structure and the bracket; and
a mounting bracket coupled to the armature that allows the spherical armature, the structure, the bracket, and the spherical armature to be rotatable together about the third axis of symmetry.

20. The machine of claim 18, further comprising:
a control coupled to, and configured to selectively energize, the plurality of stator windings, the first coil, the second coil, and the third coil, to thereby generate a Lorentz force that causes rotation of one or more of the spherical armature, the structure, the bracket, and the stator.

\* \* \* \* \*